March 31, 1959 V. M. KRAMER ET AL 2,879,953
DECORDING APPARATUS
Filed March 9, 1955
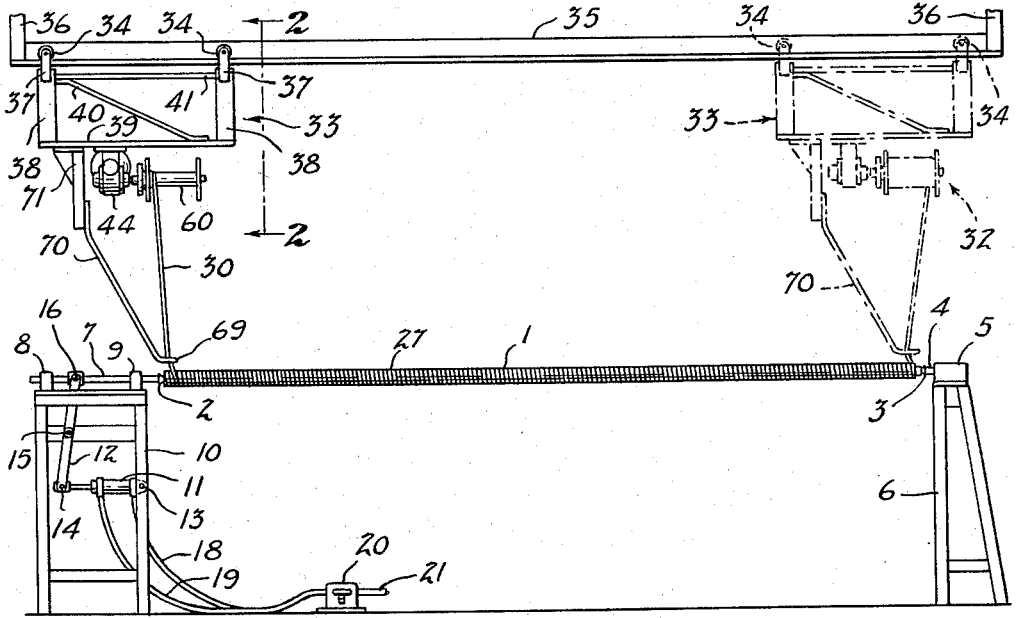
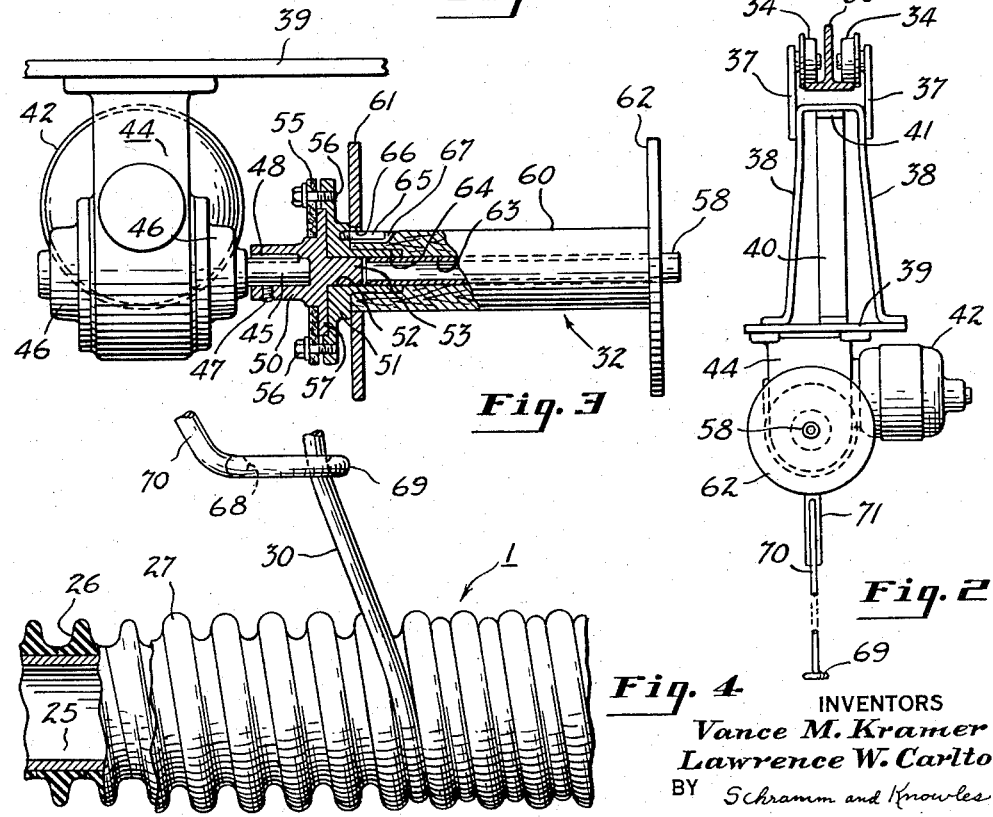
INVENTORS
Vance M. Kramer
Lawrence W. Carlton
BY Schramm and Knowles
ATTORNEYS United States Patent Office 2,879,953
Patented Mar. 31, 1959

2,879,953

DECORDING APPARATUS

Vance M. Kramer, Shaker Heights, and Lawrence W. Carlton, North Baltimore, Ohio

Application March 9, 1955, Serial No. 493,278

7 Claims. (Cl. 242—54)

This invention relates to the manufacture of spiral corrugated rubber tubing and the like, more particularly to a method of and an appartus for unwrapping the cord used to bind and hold a rubber tube on a corrugated mandrel during vulcanization.

The manufacture of spiral corrugated rubber tubing is disclosed in copending application for U.S. Patent Serial No. 381,258, filed September 21, 1953 now Patent No. 2,832,096. According to the procedure described, an extruded tube of raw rubber compound is drawn axially over an elongated mandrel for curing. The mandrel is formed with a continuous spiral or helical groove into which the uncured rubber tube is forced and held by a continuous tensile element or cord to impart the desired corrugated shape to the tube. This wrapping or cording of the rubber tube on the mandrel is accomplished by first tying or otherwise securing one end of the cord at one end of the mandrel and then wrapping the cord under tension about and along the mandrel to the other end of the latter where the other end of the cord is secured as by tying.

After the rubber tube, held in the desired corrugated shape by the cord wrapping, has been cured as in open steam, it is necessary to unwrap the tensile element or cord so that the cured corrugated rubber can be freed and removed from the corrugated mandrel. This unwrapping or decording can be accomplished manually or by a combination of manual manipulation and machine turning of the mandrel.

In its broader aspects the present invention is directed to and has for its general objective the provision of a decording process and apparatus in which a corded mandrel is rotated about its longitudinal axis, in which the cord is withdrawn from the rotating mandrel in timed relation to the rotation, and in which the cord is taken up or gathered into a compact orderly mass which travels in parallel relation to the rotational axis of the mandrel in timed relation to the turning of the mandrel and the withdrawal of the cord.

One of the more specific objectives of the invention is to effect turning of the mandrel during the decording operation by a force transmitted to the mandrel through the cord, thereby eliminating any need for separate drive means for the mandrel.

Another objective is to translate the mass of the unwrapped cord along its path paralleling the rotational axis of the turning mandrel by a force or forces transmitted through the cord. More specifically it is desired to provide the combination of means for mounting a corded mandrel to rotate about its longitudinal axis and a gathering spool for progressively receiving the cord as it is unwrapped from the mandrel, the spool being mounted to travel along a path paralleling the rotational axis of the mandrel and the spool and the mounting means therefor being arranged so that the spool maintains the cord under tension while it is being unwrapped from the mandrel, such cord tension serving both to rotate the mandrel on the mounting means and to draw the spool along the spool path in timed relation to the unwrapping operation. As a refinement of this aspect of the invention and as a further objective, there is provided a take-up spool and power drive means for rotating such spool. Both the spool and the drive means are mounted on a traveling carriage which moves along a path parallel to the rotatively mounted mandrel so that upon attachment of one end of the cord from the mandrel to the spool the latter acts to forcibly withdraw the cord from the mandrel. The resulting tension in the cord serves not only to rotate the mandrel about a predetermined fixed axis but also to effect movement of the carriage spool drive means, and take-up spool as a unit along a predetermined path which parallels the mandrel.

A still further refinement of the invention is the provision of a spool and drive combination which incorporates a friction clutch that is arranged to slip as the spool takes up the cord and the effective diameter of the spool increases. The rate of take-up is thus maintained substantially constant and overspeeding of the mandrel being decorded is avoided.

Other objects and advantages of the invention pertain to certain novel features of construction and combinations and arrangements of parts which are apparent in the following detailed description of a decording apparatus representative of the best-known mode of practicing the invention. This description is made in connection with the accompanying drawings, forming a part of the specification.

In the drawings:

Fig. 1 is a side elevational view, partly diagrammatic, showing overhead decording apparatus with which the present invention is particularly concerned, an elongated mandrel of the type used in curing corrugated rubber tubing, aligned cones for supporting the mandrel at its ends, and the relationship between the decording apparatus, the mandrel, and the cone supports for the latter;

Fig. 2 is an end view of the decording apparatus of Fig. 1, this view being taken in the plane represented by the line 2—2 of Fig. 1 and enlarged with respect to that figure;

Fig. 3 is a fragmentary elevational detail, partly in section, and with parts removed showing the electric drive-spool combination, with particular reference to the slip clutch connection, this view being enlarged with respect to both Figs. 1 and 2; and Fig. 4 is an enlarged fragmentary elevational detail showing the relation between the wrapped mandrel and the cord guide depending from the traveling carriage of the decorder, such relation being established by the cord which extends upwardly from the mandrel through the eye of the guide.

A mandrel and cured tube assembly is received by the operator of the present decording apparatus after such assembly has been withdrawn from the conventional curing chamber and cooled. The operator mounts the mandrel-tube assembly horizontally in the apparatus, the open ends of the mandrel being received on axially aligned rotatable supporting cones 2 and 3. The right-hand cone 3 is secured on a fixed horizontal spindle 4 journaled in a bearing assembly 5 on the top of a stand 6 secured to the floor of the shop in which the apparatus is located. The stand 6 is conveniently fabricated of welded-together steel angles, channels and plates.

The cone 2 is shiftable horizontally to permit insertion and removal of the mandrel-tube assembly relative to the supporting cones. To this end, the cone 2 is conveniently mounted in rotatable relation on the end of a rod 7 slidable horizontally in spaced bearing supports 8 and 9 at the same height as the remote cone 3. These supports 8 and 9 are mounted on a stand 10 fabricated like the stand 6 of welded-together steel angle and channel sectioned members and plates. A pneumatic piston and cylinder assembly 11 is pin-connected at 13 to one of the uprights of the stand 10 and actuates a double-ended lever 12. The lower end of the lever is pin-connected at 14 to the end of the piston rod; an intermediate or midpoint of the lever is pinned at 15 to a cross member of the stand, and its upper end is pinned at 16 to a block on the horizontal rod 7 that carries the cone 2. The pneumatic cylinder assembly 11 is double-acting, being connected by flexible conduits 18 and 19 to a four-way foot-operated valve 20 secured to the shop floor at a convenient point intermediate the stands 6 and 10. When the operator sets the valve 20 in one position, air from supply conduit 21 is introduced into the right-hand end of the cylinder 11 through the conduit 18 to shift the spindle 2 to the right to hold the mandrel assembly 1 in place, air exhausting from the left hand of the cylinder 11 through the conduit 19 and a vent in the valve 20. When the operator actuates the valve 20 to another position, air supplied under pressure to the valve 20 from the supply conduit 21 is introduced into the left end of the air cylinder 11 through the conduit 19 to retract piston rod and thereby shift the cone 2 to the left, air exhausting from the right end of the cylinder 11 through the conduit 18 and a vent in the valve 20.

The mandrel assembly 1, shown in more detail in Fig. 4, may be constructed in various ways, the arrangement illustrated being like that shown in the patent application referred to. The main structural member of the mandrel is a steel tube 25 about which is spirally wrapped an extruded relatively hard rubber core strip 26. This strip is laid up with adjacent convolutions in side-by-side abutting relation and is so shaped that it defines the internal corrugated surface of rubber tube 27 cured thereon. The stock from which the corrugated tube 27 is made is supplied as a cylindrical extrusion that is drawn axially over the mandrel in a preliminary operation. A flexible tensile element or cord 30 is wrapped about the tube 27 on the mandrel, this cord forcing the raw or partially cured cylindrical rubber tube blank into the continuous spiral corrugation defined by the spiral core strip 26.

With the mandrel-tube assembly 1 mounted for free rotation between the end cones 2 and 3, the operator unfastens the tensile element or cord 30 from its anchorage at the left hand of the tube, threads it through eye 68 of guide 70, as will appear, and connects such cord to spool 32 of the traveling take-up mechanism.

The take-up mechanism comprises a carriage 33 suspended by pairs of trolley wheels 34 from an overhead horizontal T-track 35. This track is disposed above and in parallel relation to the supported mandrel-tube assembly 1 so that in riding back and forth along the track the carriage 33 travels a course or path paralleling the rotational axis of the mandrel-tube assembly on the centering cones 2 and 3. End uprights or members 36 secure the track to the structure of the building in which the shop is located or, if desired, the ends of the track may be secured to columns located beyond the stands 6 and 10. The trolley wheels 34 of each pair are disposed on opposite sides of the track web, being carried by the bottom horizontal flanges of the track. Stub shafts for the trolley wheels are secured in the upper ends of vertical tie elements 37 the lower ends of which are fastened to inverted U-shaped members 38 that have flanged ends welded to horizontal platform member plate 39 of the carriage. A horizontal tie member 41 connects the upper ends of the inverted U-members 38, and a diagonal brace 40 connects the tie 41 to the platform member 39 to provide the desired stability and resistance to endwise distortion of the carriage. The several components of the carriage are conveniently formed of rolled steel strip stock, being fastened together by welding or bolting.

Suspended from the bottom of the platform 39 is an assembly comprising an electric motor 42 and a reduction gear drive unit 44 which includes a shaft 45 that carries the take-up spool 32 previously mentioned. The reduction gear 44 is secured against the bottom surface of the carriage platform 39, the electric motor 42 being flange mounted to the casing of the reduction gear unit in conventional fashion and so as to be cantilever supported thereby. Electrical energy is supplied to the motor 42 by a flexible two-conductor cord (not shown) which is suitably festooned so as to permit free movement of the carriage back and forth along the length of the track 35 between the full line position of Fig. 1 representing the start of a decording operation and the broken line position of the same figure representing the end of the decording operation. The electrical energy is supplied to such cord from a conventional source through a manual switch that the operator actuates to start and stop the spool drive as desired. The shaft 45 is journaled in suitable bearings carried by circular end members or plates 46 disposed and secured against opposite sides of the casing of the reduction gear unit 44. The shaft 45 is driven by the motor 42 at a reduced speed, say, of the order of from about 50 to about 100 revolutions per minute, the gearing within the reduction unit 44 being designed to transmit power from the motor to the shaft 45 at the reduced rotation speed as is well known.

Secured on the projecting shaft 45 as by set screw 47 and key 48 is a flanged hub or driving member 50 of a friction torque limiting slip clutch. The driven member of the clutch is a circular flanged member 51 formed with an axial bore 52 that has a running fit on a stub 53 projecting axially from the face of and integral with the drive member 50. A circular friction disc 55 of fiber or suitable composition material is received against the annular rear face of the circular flange on the clutch drive member 50 and is secured to the flange of the driven member 51 by a series of circumferentially spaced cap screws 56 that pass through holes bored in the friction disc and are threaded into tapped holes in the periphery of the cast iron driven member 51. The friction disc 55 is formed with a central opening so as to be received over the hub 50 of the driving member. By tightening the screws 56, flange 57 of the driving member is gripped between the confronting faces of the friction disc 55 and the flange of the driven member 51 so as to impart the desired driving torque to the latter. Adjustment of the screws 56 permits the clutch structure to be set to slip when excessive torque is supplied.

The bore 52 in the hub of the driven member 51 is of greater axial length than the locating stub 53 and in its outer end receives as by a press fit tubular metal extension spindle 58, which is thus supported cantilever fashion.

The spool 32 may be formed of suitable material such as fiber, wood or metal and comprises a cylindrical hub 60 which is several times greater in axial length than diameter and a pair of spaced parallel circular end members or plates 61 and 62 that are fast on the ends of the cylindrical hub or body 60. The body 60 is formed with an axial bore 63 that slidingly receives the cantilever extension tube 58 of the driving member and with an enlarged or counterbored end portion 64 that slidingly receives the hub of the driven member 51.

A pin 65 is secured as by screwing or press fitting into a socket in the driven member 51 of the clutch and projects into the spool 32 to drive the latter. The pin 65 is parallel to the rotational axis of the clutch members and is received through a hole 66 in the spool end member 61 and in a channel or recess 67 aligned with the hole and cut in the spool hub body 60. The pin 65 may be inclined, if desired, in the direction of rotation (clockwise as viewed in Fig. 2) so as to hold the spool 32 seated against the hub of the clutch driven member 51. In practice, however, it is generally unnecessary to incline the pin 65, since the arrangement of the parts is such that axial forces imparted to the spool by the tensile element or cord 30 in being taken up are insufficient to draw the spool off the pin. So that the cord 30 may be directed onto the rotating spool 32 from a substantially constant point located at a remote distance (here at least 10 times the spool diameter), the cord is threaded through eye 68 formed in foot 69 of a depending guide member 70 secured to a bracket 71 attached to the underside of the carriage platform 39. The guide 70 is formed of a circular sectioned steel rod, preferably a spring steel rod so as to permit limited flexing under the influence of horizontal forces imparted to the foot 69 by the cord 30. Thus the eye 68 may be formed by bending the lower end of the rod into a circular ring which is disposed in a horizontal plane, the ring constituting guide foot 69. The upper end of the rod member 70 is fastened to the depending bracket 71 by clamping or welding.

In proportioning the various components of the carriage 33 to the U-shaped suspension members 38 are selected in length so that the spool 32 is supported at about eye level of the operator, convenient to his reach. The spool is thus readily slid axially onto and off the driven member 51 of the friction clutch and the horizontal extension tube 58 associated therewith.

A separate spool is used for each mandrel assembly 1 that is decorded so that the decorded mandrel, together with the spool 32 carrying the cord removed therefrom, can be taken together to the station or location where another raw rubber tube is assembled on the mandrel and corded in place for curing to repeat the manufacturing cycle. It is understood, of course, that the cured tube is first removed from the decorded mandrel-tube assembly at an intermediate stripping station.

At the commencement of the decording operation, shown diagrammatically by the full lines of Fig. 1, the cord 30 is untied or released from its anchorage at the left end of the mandrel assembly 1 and the end of the cord is threaded or extended upwardly through the eye 68 in the foot of the guide member 70 and thence onto the body 60 of the take-up spindle 32. The cord is secured to the spool by knotting or otherwise, it being understood that the operator manually unwraps enough cord from the mandrel assembly for the threading operation. When the operator energizes the electric drive motor 42 by means of the manual switch mentioned above, the spool 32 is rotated and draws the cord 30 onto the spool hub or body 60. The pull on the cord 30 causes the mandrel-tube assembly 1 to rotate, unwinding the cord 30 progressively along the length of the mandrel. As the cord unwinds, the point at which it leaves the mandrel migrates from left to right, as viewed in Fig. 1, so that until the carriage commences to move the angular position of the cord relative to the foot 69 of the guide member 70 increases. When the horizontal component of the tension force in that portion of the cord 30 which extends between the guide foot 69 and the mandrel 1 is sufficient to overcome the friction in the trolley wheels 34 and the other components of the carriage suspension, the carriage 33 shifts to the right and follows the migration of the cord take-off point. Since the winding of the cord onto the spool 32 and the migration or travel of the cord take-off point are continuous, the horizontal force component thus provided maintains the movement of the carriage so as to follow along the entire length of the mandrel as the decording of the latter proceeds.

As the cord wraps about the hub 60 of the spool and thereby increases the effective diameter of the spool and since the electric drive motor 42 is essentially a constant speed device, the tendency of the take-up mechanism is to withdraw the cord from the mandrel 1 at a progressively increasing rate. Since the mandrel-tube assembly 1 is relatively long, there is a tendency for it to whip or gyrate when rotated at a high rate of speed, particularly when the rotation is accomplished by decording. To prevent such undesirable whipping of the mandrel and to hold its rotational speed below a safe minimum, the friction clutch assembly is adjusted so that slippage occurs when the tension in the cord 30 exceeds a predetermined maximum. This arrangement has other advantages, in that damage to the apparatus and injury to the operator are avoided should a stoppage of the mandrel 1 or the travel of the cord 30 be interfered with in any way.

Should a sudden force be applied to the carriage 33, as through the cord 30, causing the carriage to overspeed or overrun the mandrel, the upward run of the cord 30 would shift to the rear of the guide eye 68, and the horizontal force component in the cord would then retard the movement of the carriage. In this fashion the guide foot 69 located relatively close to the point at which the cord 30 leaves the mandrel closely controls the movement of the carriage and insures a decording operation that is uniform and safe. The resiliency of the guide member 70 absorbs shocks and jerks so that excessive stresses in the apparatus are eliminated and smooth action results.

The present invention thus provides a simple and effective decording apparatus for unwrapping the spiral cord used in confining seamless rubber tubing in the manufacture of flexible corrugated tubing. The suspended carriage is readily swingable on the overhead track in a plane transverse to its travel path so that the guide foot 69 can be accurately located laterally relative to the take-off point of the cord 30 in leaving the mandrel. The free running movement of the carriage 33 on the track 35 permits the carriage to be moved readily by the small horizontal force component in the cord 30 as the latter is unwrapped and to follow along the entire length of the mandrel. At the end of each decording operation (indicated by the broken lines of Fig. 1) the carriage is readily moved to its initial or starting position by the operator.

In accordance with the patent statutes the principles of the present invention may be utilized in various ways, substitution of parts and changes in construction being resorted to as desired, it being understood that the embodiment shown in the drawings and described above and the particular method set forth are given merely for purposes of explanation and illustration without intending to limit the scope of the claims to the specific details disclosed.

What we claim and desire to secure by Letters Patent of the United States is:

1. Decording apparatus comprising means for supporting an elongated mandrel horizontally against endwise movement and to turn about its longitudinal axis, a carriage and means mounting the carriage to travel along a predetermined horizontal path paralleling the rotational axis of the mandrel, a take-up spool mounted on the carriage, a guide member carried by the carriage and extending toward a supported mandrel, said guide member having a cord receiving end closer to a supported mandrel than to the spool, and means on and wholly supported by the carriage operatively connected to and driving the spool to draw cord along a run extending from a supported mandrel, through the cord receiving end of the guide member and to the spool, whereby tension in the cord run rotates a supported mandrel in drawing off cord wrapped about such mandrel and when that portion of the tensioned cord run extending between the mandrel and the guide is disposed at an acute angle to the path of the carriage one component of the force tensioning the cord parallels the carriage path and draws the carriage along its path simultaneously with the unwinding of the cord being drawn off the mandrel.

2. Decording apparatus comprising means for supporting an elongated mandrel horizontally against endwise movement and to turn about its longitudinal axis, a carriage and means mounting the carriage to travel along a predetermined horizontal path above and parallel to the rotational axis of the mandrel, a take-up spool mounted on the carriage, means on and wholly supported by the carriage operatively connected to and driving the spool to draw cord upwardly from a supported mandrel about which the cord is wrapped along a run extending to the spool, and a guide member carried by and depending from the carriage, the lower end of the guide member being located closer to a supported mandrel than to the spool and substantially embracing the cord run whereby tension in the cord run rotates a supported mandrel in drawing off cord wrapped about such mandrel and when that portion of the tensioned cord run extending between the mandrel and the guide is disposed at an acute angle to the path of the carriage one component of the force tensioning the cord parallels the carriage path and draws the carriage along its path simultaneously with the unwinding of the cord being drawn off the mandrel.

3. Decording apparatus comprising means for supporting an elongated mandrel horizontally against endwise movement and to turn about its longitudinal axis, a carriage and means mounting the carriage to travel along a predetermined horizontal path paralleling the rotational axis of the mandrel, electric drive means on the carriage and movable therewith, said drive means having a rotatable driven cantilever spindle, and a take-up spool received on the spindle to be driven thereby and for facile removal and replacement, whereby upon energization of the electric drive means cord wrapped about a supported mandrel can be drawn therefrom by said spool along a run extending between such mandrel and spool, tension maintained in said cord run being effective to provide a turning force to rotate a supported mandrel and thereby unwind the cord wrapped about the mandrel and when the cord run is disposed at an acute angle to the path of the carriage to provide a force component paralleling such path to draw the carriage along its path simultaneously with the unwinding of the cord.

4. Apparatus for removing flexible cord from an elongated tube about which the cord is wrapped spirally, said apparatus comprising means supporting the wrapped tube to turn about a fixed axis and holding the supported tube against endwise movement, a cord take-up spool and drive means operatively connected to the spool, a carriage, the spool and the drive means being mounted on the carriage to travel as a unit, means mounting and guiding the carriage unit to travel along a predetermined path paralleling the turn axis of the supported tube, a guide on the carriage for engaging the cord running between the tube and the driven spool, the tension maintained in the cord run by driving the spool rotating the tube to unwind the cord and withdrawing the unwound cord tangentially from the tube along a straight portion of such cord run extending between a point of departure on the tube and the guide, the migration of the point of departure of the cord along the tube as the cord is unwound orienting the straight run cord portion so that one component of the force in the tensioned cord parallels the path of the carriage unit and reacts on the guide, and said guide reacting on the carriage to move the latter along its path under the influence of such force component to move the carriage unit substantially in unison with the migration of the departure point of the cord.

5. Apparatus for removing flexible cord from an elongated tube about which the cord is wrapped spirally, said apparatus comprising means supporting the wrapped tube to turn about a fixed axis and holding the supported tube against endwise movement, a cord take-up spool and drive means operatively connected to the spool, a carriage, the spool and the drive means being mounted on the carriage to travel as a unit, a track and means mounting the track in parallel relation to the turning axis of the supported tube, means suspending the carriage unit from the track to travel a predetermined path paralleling such axis and above the supported tube, a guide on and extending downwardly from the carriage toward the supported tube for engaging the cord running between the tube and the driven spool, the tension maintained in the cord run by driving the spool rotating the tube to unwind the cord and withdrawing the unwound cord tangentially from the tube along a straight portion of such cord run extending between a point of departure on the tube and the guide, the migration of the point of departure of the cord along the tube as the cord is unwound orienting the straight run cord portion so that one component of the force in the tensioned cord parallels the path of the carriage unit and reacts on the guide, and said guide reacting on the carriage to move the latter along its path under the influence of such force component to move the carriage unit substantially in unison with the migration of the departure point of the cord.

6. Apparatus for removing flexible cord from an elongated tube about which the cord is wrapped spirally, said apparatus comprising means for supporting the wrapped tube to turn about its longitudinal axis between fixed centers and for holding the supported tube against endwise movement, a carriage and means supporting and guiding the carriage for rectilinear movement along a predetermined path paralleling said rotational axis, an electric motor and a speed reducer drive assembly mounted on the carriage as a unit for bodily movement in unison therewith, the speed reducer being operatively connected to the motor and having an output shaft, a cord take-up spool, rotatable drive means operatively connected to and wholly supported by the output shaft, the spool being mounted on the rotatable drive means to be actuated by the latter to draw cord onto the spool from a wrapped tube in a run which has a point of departure from the tube that migrates along the length of the tube as the cord is drawn from the latter, and the rotatable drive means constituting the sole support for the spool and including a slip clutch between the spool and the output shaft of the motor to limit the torque imparted to the spool by the motor, the tension in the cord run providing a force which moves the carriage along its path when migration of the departure point of the cord disposes the cord run at an acute angle to such path.

7. Apparatus for removing flexible cord from an elongated tube about which the cord is wrapped spirally, said apparatus comprising means for supporting the wrapped tube to turn about its longitudinal axis between fixed centers and for holding the supported tube against endwise movement, a carriage and means supporting and guiding the carriage for rectilinear movement along a predetermined path paralleling said rotational axis, an electric motor and a speed reducer drive assembly mounted on the carriage as a unit for bodily movement in unison therewith, the speed reducer being operatively connected to the motor and having an output shaft, a cord take-up spool, rotatable drive means operatively connected to and wholly supported by the output shaft, the rotatable drive means including a shaft member supported as a cantilever, the spool being received over the cantilever shaft member for facile removal and replacement by relative axial movement, means providing a driving connection between the drive means and the spool to rotate the latter to draw cord onto the spool from a wrapped tube in a run which has a point of departure from the tube that migrates along the length of the tube as the cord is drawn from the latter, and the rotatable drive means constituting the sole support for the spool and including a slip clutch between the spool and the output shaft of the motor to limit the torque imparted to the spool by the motor, the tension in the cord run providing a force which moves the carriage along its path when migration of the departure point of the cord disposes the cord run at an acute angle to such path.

References Cited in the file of this patent

UNITED STATES PATENTS

| Number | Name | Date |
|---|---|---|
| 665,015 | Kennedy | Jan. 1, 1901 |
| 1,228,059 | Schneider | May 29, 1917 |
| 1,275,073 | Moomy | Aug. 6, 1918 |
| 1,282,294 | Ross | Oct. 22, 1918 |
| 1,524,453 | Perrault | Jan. 27, 1925 |
| 1,683,787 | Maas | Sept. 11, 1928 |
| 1,714,945 | Buhl | May 28, 1929 |
| 2,643,075 | Moore | June 23, 1953 |